(12) United States Patent
Lee et al.

(10) Patent No.: US 10,455,073 B2
(45) Date of Patent: Oct. 22, 2019

(54) USER TERMINAL DEVICE AND CONTROL METHOD THEREFOR

(71) Applicant: SAMSUNG ELECTRONICS CO., LTD., Suwon-si (KR)

(72) Inventors: Yoonkyong Lee, Seoul (KR); ByoungOh Kim, Suwon-si (KR); Chul-Joo Kim, Suwon-si (KR); SangJeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/072,804

(22) PCT Filed: Nov. 25, 2016

(86) PCT No.: PCT/KR2016/013676
§ 371 (c)(1),
(2) Date: Jul. 25, 2018

(87) PCT Pub. No.: WO2017/131335
PCT Pub. Date: Aug. 3, 2017

(65) Prior Publication Data
US 2019/0045040 A1    Feb. 7, 2019

(30) Foreign Application Priority Data

Jan. 25, 2016    (KR) .................. 10-2016-0008869

(51) Int. Cl.
*H04M 1/725*    (2006.01)
*H04W 4/00*    (2018.01)
(Continued)

(52) U.S. Cl.
CPC .......... *H04M 1/7253* (2013.01); *G06F 3/165* (2013.01); *H04M 19/04* (2013.01); *H04W 4/00* (2013.01);
(Continued)

(58) Field of Classification Search
CPC ... H04W 4/21; H04W 88/16; H04M 1/72522; H04M 1/737
See application file for complete search history.

(56) References Cited

U.S. PATENT DOCUMENTS 8,280,541 B1    10/2012    Chen
9,025,788 B2    5/2015    Ha
(Continued)

FOREIGN PATENT DOCUMENTS

KR    10-1238368 B1    2/2013
KR    10-2014-0119916 A    10/2014
KR    10-2015-0104371 A    9/2015

OTHER PUBLICATIONS

Tsundere Raycat, "Take advantage of the LG Smart Audio multi-room feature.", Raycat, Dec. 1, 2014, http://raycatnet/3158. (15 pages total).

(Continued)

*Primary Examiner* — Diane D Mizrahi
(74) *Attorney, Agent, or Firm* — Sughrue Mion, PLLC

(57) ABSTRACT

Disclosed are a user terminal device and a control method therefor. The user terminal device according to the present invention comprises: a communication unit for communicating with a peripheral device; an audio output unit for outputting audios; and a control unit for controlling the communication unit to transmit, to the peripheral device, the audio of a second application corresponding to an event if the event occurs while the audio of a first application is output via the audio output unit. Accordingly, the user terminal device can output the audios of multiple applications by using the speaker of the user terminal device and at least one of peripheral devices.

15 Claims, 16 Drawing Sheets

(51) Int. Cl.
*H04W 88/02* (2009.01)
*G06F 3/16* (2006.01)
*H04M 19/04* (2006.01)
*G06F 3/0481* (2013.01)
*G06F 3/0484* (2013.01)
*H04M 1/60* (2006.01)

(52) U.S. Cl.
CPC ......... *H04W 88/02* (2013.01); *G06F 3/04817* (2013.01); *G06F 3/04847* (2013.01); *H04M 1/6066* (2013.01); *H04M 1/6091* (2013.01); *H04M 1/72558* (2013.01)

(56) References Cited

U.S. PATENT DOCUMENTS

| | | |
|---|---|---|
| 9,037,088 B2 | 5/2015 | Chang et al. |
| 9,112,580 B2 | 8/2015 | Kim |
| 9,674,610 B2 | 6/2017 | Kim et al. |
| 9,756,436 B2 | 9/2017 | Park et al. |
| 2009/0061769 A1 | 3/2009 | Zimbric et al. |
| 2013/0170363 A1 | 7/2013 | Millington et al. |
| 2013/0247117 A1* | 9/2013 | Yamada ............ G08C 17/02 725/93 |
| 2013/0251178 A1 | 9/2013 | Yoon et al. |
| 2014/0009268 A1* | 1/2014 | Oshima ............ G08C 17/02 340/12.5 |
| 2014/0153735 A1 | 6/2014 | Fujioka |
| 2014/0294194 A1 | 10/2014 | Park et al. |
| 2015/0100623 A1 | 4/2015 | Gudell et al. |
| 2015/0256926 A1 | 9/2015 | Kim et al. |
| 2015/0256957 A1 | 9/2015 | Kim et al. |
| 2015/0310736 A1* | 10/2015 | Yamada ............ G08C 17/02 398/107 |

OTHER PUBLICATIONS

LG, "Music flow H7/H5 Smart Hi-Fi Audio Wireless Mutli-room", NP8540 owner's manual, Jul. 31, 2015. (178 pages total).

Chul-Hee Park, "Android Audio System (Initialization of an audio flinger service)", Arrangement of Android Anatomy, http://www.slideshare.net/fefe7270/androidaudio-system, Oct. 25, 2012. (30 pages total).

Jae-Hoon Kim, "[Android] Analysis of the connection structure between Android 2.x AudioFlinger and HAL", Fisherman Fisherman, http://egloos.zum.com/shadowxx/v/10590059, Oct. 7, 2010. (12 pages total).

La Young Ho, "[Android] (8) Linux Sound Device and Android Sound System", Embedded News, http://www.oss.kr/oss_repository14/75769, Dec. 7, 2012. (32 pages total).

So-Hyun Jeon, "IT Playground/ Elite Member Tech & Talk", http://secmem.tistory.com/661, Apr. 18, 2015. (11 pages total).

Google Git, "AudioSystem.java", the Android Open Source Project, https://android.googlesource.com/platform/frameworks/base/+/master/media/java/android/media/AudioSystem.java, Aug. 21, 2015. (17 pages total).

Communication dated Feb. 27, 2017 by the International Searching Authority in International Patent Application No. PCT/KR2016/013676. (PCT/ISA/210).

Communication dated Feb. 27, 2017 by the International Searching Authority in International Patent Application No. PCT/KR2016/013676. (PCT/ISA/237).

* cited by examiner

USER TERMINAL DEVICE AND CONTROL METHOD THEREFOR

TECHNICAL FIELD

Apparatuses and methods consistent with exemplary embodiments relate to a user terminal device and a control method therefor, and more particularly, to a user terminal device which is capable of outputting audio of a plurality of applications, and a control method therefor.

DESCRIPTION OF RELATED ART

In general, a user terminal device, such as a smartphone, in a state in which an application such as a music player and the like is executed, when a call request event occurs, suspends audio of the application being executed, and outputs voice audio based on voice data received from a terminal device which has requested a call.

For example, an application for navigation is executed, when a call request event occurs, a user terminal device suspends navigation voice output being reproduced through the corresponding application, and outputs voice audio based on voice data received from a terminal device which has requested a call.

Accordingly, a user driving a vehicle experiences the inconvenience to drive a vehicle depending only on the navigation map displayed through the user terminal.

Further, the current user terminal cannot simultaneously output voice audio for various multimedia-related applications, such as a navigation and a music player, and thus, there is limitation in providing the user with various services.

DETAILED DESCRIPTION

Technical Problem

An aspect of the example embodiments relates to enabling audio of a plurality of applications to be output from a user terminal device.

Solution to Problem

According to an aspect of an example embodiment, there is provided a user terminal device, comprising: a communication unit configured to communicate with a peripheral device; an audio output unit configured to output audios; and a control unit configured to control the communication unit to transmit, to the peripheral device, the audio of a second application corresponding to an event if the event occurs while the audio of a first application is output via the audio output unit.

The control unit may control the audio output unit to output the audio of the first application while the audio of the second application is transmitted to the peripheral device via the communication unit.

The control unit may, based on communicative connection with the peripheral device being released, search for at least one other peripheral device which is capable of communicating with the user terminal device, and based on another registered peripheral device being present from among the at least one other peripheral device, control the communication unit to transmit, to the another registered peripheral device, the audio signal of the second application.

The user terminal device may further include a display unit configured to display a UI for setting a device to output the audio of each of a plurality of applications. The UI may be displayed by mapping icons of the plurality of applications with icons of devices to output the audios of the plurality of applications.

The control unit may, based on an icon of a first application from among the plurality of applications being selected, display an icon for at least one device which is capable of outputting audios, and based on the displayed at least one icon being selected, change a device corresponding to the selected at least one icon to a device to output the audio of the first application.

The control unit may, based on a peripheral device to output the audio of the second application not being registered, control the display unit to display the UI.

The control unit may, while a peripheral device to output the audio of the second application is not registered, based on a user command for adjusting volume being input, control the display unit to display a UI for an application to output audio through a speaker of the user terminal device from among applications that are executed.

The control unit may, while the audio of the second application is output via the peripheral device, based on an event in which a third application set to output audios from the peripheral device is executed occurring, control the display unit to display a UI for resetting the audio of the third application.

The communication unit may further include a connector which is physically and communicatively connected with an accessory device via a cable. The control unit may, based on a call request event being input while the communication unit is communicatively connected with the accessory device via the connector, control the communication unit to transmit, to the peripheral device, the audio of a telephone application corresponding to the call request event.

In a case in which the first application is a camera application, based on a call request event being input while the camera application is executed, the control unit may control the communication unit to transmit, to the peripheral device, the audio of a telephone application corresponding to the call request event.

The control unit may, based on a message being received from the outside while at least one of an execution screen of the first application and the audio of the first application is output, control the communication unit to transmit voice data for the message to a peripheral device.

According to an aspect of an example embodiment, there is provided a method for controlling a user terminal device, the method comprising: outputting the audio of a first application; while the audio of the first application is output, determining whether an event occurs; and based on the event occurring, transmitting the audio of a second application corresponding to the event to a peripheral device which is capable of communicating with the user terminal device.

The outputting may include outputting the audio of the first application while the audio of the second application is transmitted to the peripheral device.

The method may further include determining whether the communicative connection with the peripheral device is released, and based on the communicative connection with the peripheral device being released, searching for at least one other peripheral device which is capable of communicating with the user terminal device. The transmitting may include, based on another registered peripheral device being present from among the at least one other peripheral device, transmitting an audio signal of the second application to the another registered peripheral device.

The method may further include displaying a UI for setting a device to output the audio of each of a plurality of applications, and setting a device to output audios based on the displayed UI. The UI may be displayed by mapping icons of the plurality of applications with icons of devices to output the audios of the plurality of applications.

The setting may include, based on an icon of a first application from among the plurality of applications being selected, displaying an icon for at least one device which is capable of outputting audios, and based on the displayed at least one icon being selected, changing a device corresponding to the selected at least one icon to a device to output the audio of the first application.

The control unit may, based on a peripheral device to output the audio of the second application not being registered, control the display unit to display the UI.

The displaying may include, while a peripheral device to output the audio of the second application is not registered, based on a user command for adjusting volume being input, displaying a UI for an application to output audio through a speaker of the user terminal device from among applications that are executed.

The displaying may include, while the audio of the second application is output via the peripheral device, based on an event in which a third application set to output audios from the peripheral device is executed occurring, displaying a UI for resetting the audio of the third application.

The transmitting may include, based on a call request event being input while the communication unit is communicatively connected with an accessory device via a connector, transmitting the audio of a telephone application corresponding to the call request event to the peripheral device.

The transmitting may include, based on a message being received from the outside while at least one of an execution screen of the first application and the audio of the first application is output, transmitting voice data for the message to a peripheral device.

Effect of the Invention

As described above, according to the present disclosure, a user terminal may output audio of a plurality of applications by using at least one of a speaker of the user terminal device and a peripheral device.

PREFERRED EMBODIMENTS FOR CARRYING OUT THE INVENTION

Figure 1:
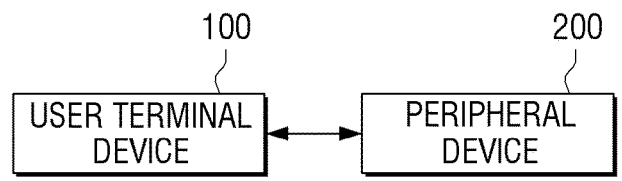
FIG. 1 is a diagram illustrating a system for audio output for each a plurality of applications, according to an example embodiment.

Prior to explaining embodiments of the present disclosure, an explanation will be made on a method by which embodiments of the present specification and drawings are disclosed.

First of all, the terms used in the present specification and the claims are general terms selected in consideration of the functions of the various embodiments of the present disclosure. However, these terms may vary depending on intention, legal or technical interpretation, emergence of new technologies, and the like of those skilled in the related art. Also, there may be some terms arbitrarily selected by an applicant. Unless there is a specific definition of a term, the term may be construed based on the overall contents and technological common sense of those skilled in the related art.

Also, the same reference numerals or symbols described in the attached drawings denote parts or elements that actually perform the same functions. For convenience of descriptions and understanding, the same reference numerals or symbols are used and described in different exemplary embodiments. In other words, although elements having the same reference numerals are all illustrated in a plurality of drawings, the plurality of drawings do not mean one exemplary embodiment.

Further, the terms including numerical expressions such as a first, a second, and the like may be used to explain various components, but there is no limitation thereto. The ordinal numbers are used in order to distinguish the same or similar elements from one another, and the use of the ordinal number should not be understood as limiting the meaning of the terms. For example, an element combined with an ordinal number is not limited because of the ordinal number in the order the element is being used, in the order the element is being disposed, and so on. The respective ordinal numbers are interchangeably used, if necessary.

The singular expression also includes the plural meaning as long as it does not differently mean in the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not illustrated).

Further, in embodiments of the present disclosure, when it is described that a portion is connected to another portion, the portion may be either connected directly to the other portion, or connected indirectly via another medium. Further, when a certain portion includes a certain element, unless specified to the contrary, this means that another element may be additionally included, rather than precluding another element.

Hereinafter, the present disclosure will be described in detail with reference to the accompanying drawings.

FIG. 1 is a diagram illustrating a system for audio output for each a plurality of applications, according to an example embodiment.

As illustrated in FIG. 1, a system for audio output for each of a plurality of applications includes a user terminal device 100 and a peripheral device 200.

The user terminal device 100 outputs audio of at least one of a plurality of applications via a speaker. This user terminal device 100 may be a portable terminal device, such as a smartphone and a tablet PC.

In addition, the peripheral device 200 may be a device which outputs audio received from the user terminal device 100. This peripheral device 200 may be an electronic device, such as a wearable device, a smart TV, a terminal device for vehicles, a speaker, and the like, which may communicate with the user terminal device 100.

In detail, the user terminal device 100, according to a user setting, outputs audio of a first application from among a plurality of applications via a speaker of the user terminal device 100, and transmits an audio signal of a second application to the peripheral device so that audio of the second application is output through a speaker of the peripheral device communicable with the user terminal device 100.

Accordingly, the user terminal device 100 may output audio of the first application, and the peripheral device 200 may output audio of the second application based on an audio signal received from the user terminal device 100.

For example, the first application may be a navigation, and the second application may be a media player. For these first and second applications, the user may set audio of the first and second applications to be output from each device. That is, the user may set audio of the first application to be output through a speaker of the user terminal device 100 and set audio of the second application to be output from the peripheral device 200 which may communicate with the user terminal device 100. In this regard, the peripheral device 200 may be a terminal device for vehicles which is mounted on a vehicle and outputs car audio.

In a state in which devices to output audio of the first and second application are set, when an execution command of the first application is input, the user terminal device 100 may display an execution screen of a navigation and simultaneously, output navigation-related audio via a speaker of the user terminal device 100.

In a state in which a navigation is executed, when a command to execute the second application is input, the user terminal device 100 executes a media player, which is the second application, and transmits an audio signal for music reproduced through the executed media player to the peripheral device 200 found as a communicable device. In this regard, the peripheral device 200 which has been found as being communicable may be a terminal device for vehicles which is set to be an apparatus to output audio of the second application. Accordingly, the peripheral device 200 may reproduce music for the audio signal received from the user terminal device 100 via a speaker mounted in the peripheral device 200.

Accordingly, the user who got on the vehicle may, while driving the vehicle through a navigation executed through the user terminal device 100, listen to music reproduced through a media player of the user terminal device 100 through the peripheral device 200 which is a terminal device for vehicles mounted on the vehicle.

Hereinabove, a system for audio output for each of a plurality of applications according to the present disclosure is briefly described. Hereinafter, the respective configurations of the user terminal device 100 according to the present disclosure will be described in greater detail.

Figure 2:
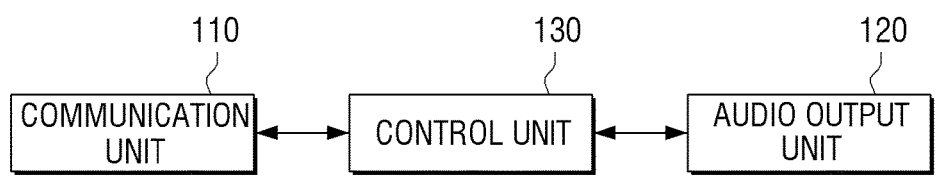
FIG. 2 is a block diagram of a user terminal device, according to an example embodiment.
Figure 3:
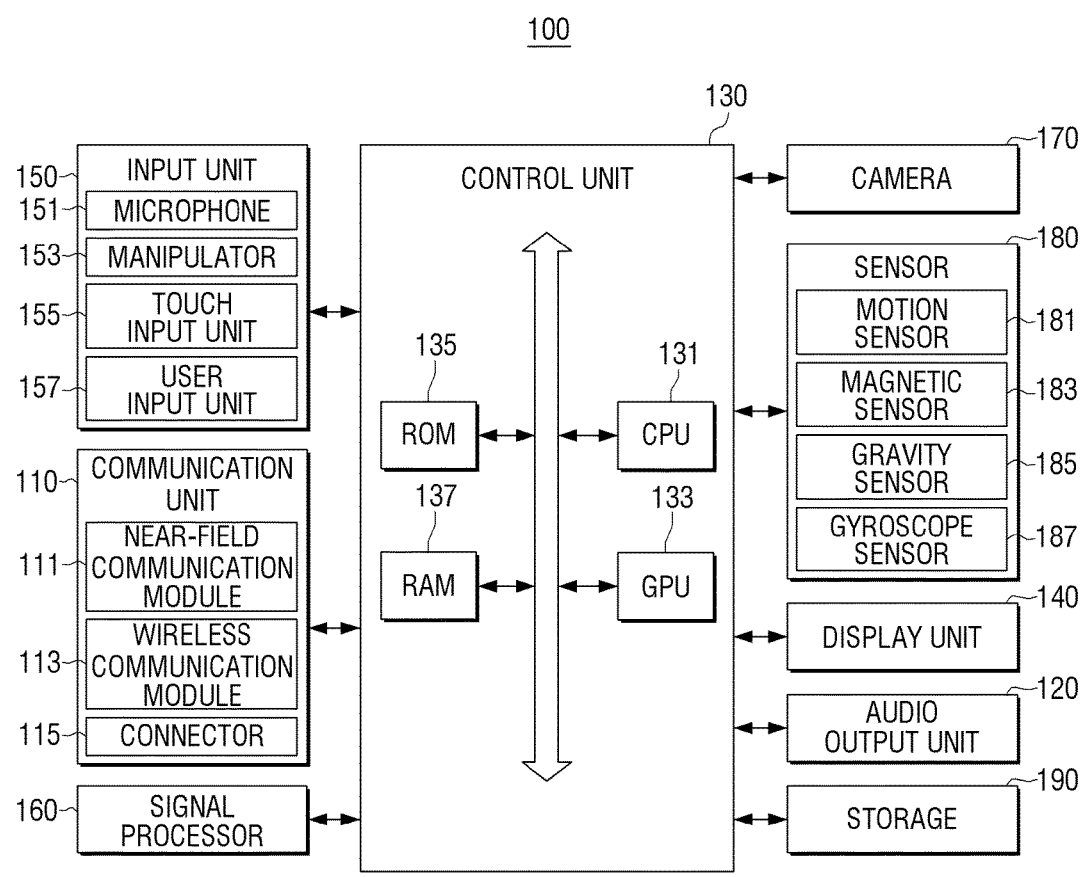
FIG. 3 is a block diagram illustrating a detailed user terminal device, according to an example embodiment.

FIG. 2 is a block diagram of a user terminal device, according to an example embodiment. FIG. 3 is a block diagram of a detailed user terminal device, according to an example embodiment.

As illustrated in FIG. 2, the user terminal device 100 includes a communication unit 110, an audio output unit 120, and a control unit 130.

The communication unit 110 includes various communication circuitry configured to communicate with a peripheral device 200.

In addition, the audio output unit 120 outputs audio of at least one of a plurality of applications that may be executed in the user terminal device 100 via a speaker of the user terminal device 100.

When an event occurs while audio of a first application from among a plurality of applications is output via the audio output unit 120, the control unit 130 controls the communication unit 110 to transmit audio of a second application corresponding to the event to a peripheral device 200 which is capable of communicating with the user terminal device 100.

In this regard, the control unit 130, while audio of the second application is transferred to the peripheral device 200 which is capable of communicating with the user terminal device 100 via the communication unit 110, controls the audio output unit to constantly output audio of the first application via a speaker. Accordingly, the audio of the second application can be output via the peripheral device 200 while maintaining output of the audio of the first application.

According to an additional aspect of the present disclosure, when a communicative connection with the peripheral device 200 which outputs audio of the second application is released, the control unit 130 searches for at least one other peripheral device 200 which is capable of communicating with the user terminal device 100. When another peripheral device which is registered from among at least one other peripheral device is present, the control unit 130 controls the communication unit 110 to transmit an audio signal of the second application to the second peripheral device 200. Accordingly, the communication unit 110 transmits an audio signal of the second application to the second peripheral device 200.

When an audio signal for the audio of the second application is received from the user terminal device 100, the second peripheral device 200 may signal-process the received audio signal in a form capable of being output and then, output the signal-processed audio of the second application via a speaker within the second peripheral device 200.

As illustrated in FIG. 3, the user terminal device 100 may further include a display 140 for displaying a UI to set a device to output audio of each of a plurality of applications. In this regard, for a UI to set a device to output each of the plurality of applications, icons of the plurality of applications and icons of devices from which audio of the plurality of applications is output may be mapped with each other.

In a state in which this UI is displayed, when an icon of a first application from among the plurality of applications is selected, the control unit 130 controls the display 140 to display an icon for at least one device which is capable of outputting audio.

Accordingly, the display 140 displays a UI including the selected icon for at least one device which is capable of outputting audio of the first application.

In a state in which a UI including an icon for at least one device which is capable of outputting audio of the first application is displayed, when at least one icon is selected, the control unit 130 may change a device corresponding to the selected at least one icon to a device to output audio of the first application.

When a peripheral device 200 to output audio of a second application is not registered, the control unit 130 may control the display 140 to display a UI for setting a device to output audio of each of the plurality of applications.

In a state in which this UI is displayed, when an icon of the second application is selected, the control unit 130 controls the display 140 to display an icon for at least one device which is capable of outputting audio.

Accordingly, the display 140 displays a UI including the icon for at least one device which is capable of outputting audio of the second application. In a state in which a UI including an icon for at least one device which is capable of outputting audio of the second application is displayed, when at least one icon is selected, the control unit 130 may set a device corresponding to the selected at least one icon to a device to output audio of the first application.

When a peripheral device 200 to output audio of the second application is not registered, when a user command for volume adjustment is input, the control unit 130 controls the display 140 to display a UI for an application to output audio through a speaker of the user terminal device 100 from among applications that are executed. Accordingly, the display 140 may display a UI for at least one application set to output audio through a speaker from among the applications that are executed.

In a state in which a UI for at least one application set to output audio through a speaker from among these executed applications is displayed, when at least one application is selected, the control unit 130 controls the display 140 to display an icon for at least one device which is capable of outputting audio of the selected application.

Accordingly, the display 140 displays a UI including the icon for at least one device which is capable of outputting audio of the selected application.

In a state in which a UI including an icon for at least one device which is capable of outputting audio of the selected application is displayed, when at least one icon is selected, the control unit 130 may change a device corresponding to the selected at least one icon to a device to output audio of the corresponding application.

While audio of the second application is output through the peripheral device 200, when an event that a third application set such that audio is output from the corresponding peripheral device 200 is executed occurs, the control unit 130 controls the display 140 to display a UI for resetting audio of the third application.

Accordingly, the display 140 displays a UI including the icon for at least one device which is capable of outputting audio of the third application. In a state in which a UI including an icon for at least one device which is capable of outputting audio of the third application is displayed, when at least one icon is selected, the control unit 130 may change a device corresponding to the selected at least one icon to a device to output audio of the third application.

According to an additional aspect of the present disclosure, in a case where a first application is a camera application, when a call request event is input while the camera application is executed, the control unit 130 may transmit audio of a phone application corresponding to the call request event to the peripheral device 200.

Accordingly, the user can make a voice call with another user through the peripheral device while capturing an image using a camera executed through the user terminal device 100.

According to an additional aspect of the present disclosure, when a message is received from an external source while at least one of an execution screen of the first application and audio is output, the control unit 130 may control the communication unit 110 to transmit voice data for the received message to the peripheral device 200.

As illustrated in FIG. 3, the communication unit 110 may include a short range communication module such as the NFC module 111, a wireless communication module 113 such as a wireless local access network (LAN) module, and a connector 115 including at least one of wired communication modules such as a high-definition multimedia interface (HDMI), a universal serial bus (USB), Institute of Electrical and Electronics Engineers (IEEE) 1394.

The NFC module 111 is configured to wirelessly perform NFC between the user terminal device 100 and the peripheral device 200. Here, the NFC module 161 may include at least one of a BT module, an infrared data association (IrDA) module, an NFC module, a WIFI module, and a Zigbee module.

Further, the wireless communication module 113 is a module that is connected to an external network according to a wireless communication protocol such as IEEE to perform communications. In addition, the wireless communication module may further include a mobile communication module which is connected to a mobile communication network according to various mobile communication standards such as 3rd generation (3G), 3rd generation partnership project (3GPP), and long term evolution (LTE) to perform communications.

As such, the communication unit 110 may be implemented by the above-mentioned various short range communication schemes and may adopt other communication technologies not mentioned in the present specification as needed.

The connector 115 is a configuration for providing an interface with a variety of source apparatuses, such as USB 2.0, USB 3.0, HDMI, IEEE 1394, and the like. This connector 115 may be physically connected with an accessory device for capturing images via a cable. This connector 113 may receive content data received from an external server (not illustrated) via a cable connected with the connector 115 according to a control command of the control unit 130, or may transmit a pre-stored content data to an external recording medium. Further, the connector 115 may receive power from a power source through the wired cable physically connected to the connector 115.

In addition, the display 140 may not only display various UI screens for controlling an operation of the user terminal device 100 but also display a content received from an external server, such as a content server (not illustrated) or a pre-stored content.

The display 140 may be implemented as a liquid crystal display (LCD), an organic light emitting display (OLED), a plasma display panel (PDP), or the like. In particular, the display 140 may be implemented in a touch screen form having a mutual layer structure with a touch input 153 receiving a touch command of a user to be described below.

When the user terminal device 100 is a portable terminal device, such as a smartphone, in addition to the above-described components, as illustrated in FIG. 3, the user terminal device 100 may further include an input unit 150, a signal processor 160, a camera 170, a sensor 180, and a storage 190.

The input 150 may be an input means receiving various user commands and transferring the input user command to the control unit 130, and may include a microphone 151, a manipulator 153, a touch input unit 155, and a user input unit 157.

The microphone 151 may receive the voice command of the user and the manipulator 153 may be implemented by a key pad including various function keys, a numeric key, a special key, a character key, or the like. In addition, the touch input unit 155, in a case in which the display 140 which is described above is implemented in the form of a touch screen, may be implemented as a touch pad forming a interlayer structure with the display 140. In this case, the touch input unit 155 may receive a selection command for various application-related icons displayed on the display 140.

The user input 157 may receive an IR signal or an RF signal for controlling the operation of the user terminal device 100 from at least one peripheral device (not illustrated) like a remote control device.

The signal processor 160 may be an element for processing, according to a control command of the control unit 130, a content received via the communication interface 110 or image data and audio data of a content stored in the storage 190.

In more detail, the signal processor 160 may perform various image processes, such as decoding, scaling, noise filtering, frame rate conversion, resolution conversion, and the like, on the image data included in the content. Further, the signal processor 160 may perform various audio signal processing, such as decoding, amplification, and noise filtering, on the audio data included in the content.

The camera 170 is to photograph still images or moving images according to the user command and may be implemented in plural like a front camera and a rear camera.

The sensor 180 may be a sensing sensor that senses the motion of the user terminal device 100, and may include at least one of a motion sensor 181, a magnetic sensor 183, a gravity sensor 185, and a gyroscope sensor 187.

The motion sensor 181 may be an accelerometer sensor measuring acceleration or an intensity of impact of a moving user terminal device 100.

The magnetic sensor 183 is an electronic compass that may detect an azimuth using an earth's magnetic field and is sensor that is used for positioning, three dimensional (3D) video game, or the like or used for a smart phone, a radio set, GPS, personal digital assistant (PDA), a navigation device or the like.

The gravity sensor 185 is a sensor detecting in which direction gravity is applied and is a sensor that automatically rotates depending on a moving direction of the display device 100 to sense the direction.

The gyroscope sensor 185 is a sensor that adds a rotation function to the existing motion sensors 181 to recognize a 6-axis direction to thereby help recognize a more elaborate and precise operation.

Meanwhile, the present disclosure describes only the case in that the sensor 180 includes at least one of the motion sensor 181, the magnetic sensor 183, the gravity sensor 185, and the gyroscope sensor 187 but is not limited thereto. Therefore, the sensor 180 may further include a proximity sensor (not illustrated) that is used to determine how much an object is approached prior to contacting another object, an optical sensor (not illustrated) that senses received light and converts the light into an electrical signal, or the like.

The storage 190 stores an execution program for a plurality of applications downloaded according to a user's request, a content, various setting information set by the user, and the like. Further, the storage 250 may further store an operating program for controlling an operation of the user terminal device 100. In this regard, the operating program may be a program which is, when the user terminal device 100 is turned on, read in the storage 190 and compiled to operate each configuration of the user terminal device 100. The storage 190 may be implemented by using at least one of a memory card (e.g., an SD card and a memory stick) which can be mounted in or dismounted from a read only memory (ROM), a random access memory (RAM), or the user terminal apparatus 100, a non-volatile memory, a volatile memory, a hard disk drive (HDD), and a solid state drive (SSD).

The control unit 130 may control an overall operation of the user terminal device 100 or may be a processing device which controls an overall operation of the user terminal device to be controlled. The control unit 130 may be interchangeably used with a central processing unit (CPU), a microprocessor, and the like, and may copy various programs stored in the storage 190 onto a RAM and execute a program copied onto the RAM, to thereby carry out various operations.

In detail, the control unit 120 may include a CPU 121, a GPU, a ROM 125, and a RAM 127. The CPU 121, the GPU 133, the ROM 125, and the RAM 127 may be interconnected with each other via a bus.

The CPU 131 accesses the storage 190 and performs booting using the O/S stored in the storage 190. In addition, the CPU 131 performs various operations using various programs, contents, and data stored in the storage 190.

The GPU 133 generates a display screen including a variety of objects, such as an icon, an image, a text, and the like. In more detail, the GPU 133 calculates an attribute value, such as a coordinate value, shape, size and color of each of the objects to be displayed, according to a layout of a screen based on the received control command, and generates a display screen of various layouts including the object based on the calculated attribute value.

The ROM 135 may store a command set, and the like for system booting. If a turn-on command is input and the power is supplied, the CPU 131 copies the O/S stored in the memory 190 into the RAM 137 according to the command stored in the ROM 135, and boots the system by executing the O/S. When the booting is completed, the CPU 131 may copy the various programs stored in the storage 190 to the RAM 137, and perform various operations by implementing the programs copied to the RAM 137.

The control unit 140 may be implemented by a system-on-a chip (SOC) or a system on chip (SoC) by being combined with each of configurations described above.

So far, each component of the user terminal device 100 according to the exemplary embodiment of the present disclosure will be described in detail. Hereinafter, the operation of outputting audio of an application through a device set for each application from the user terminal device 100 according to an example embodiment of the present disclosure will be described in detail.

Figure 4:
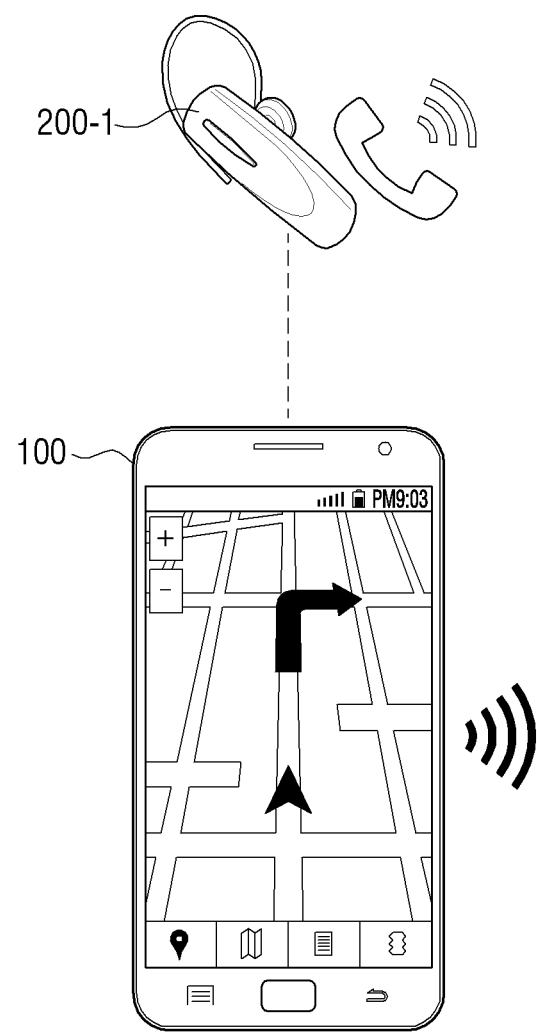
FIG. 4 is a first diagram illustrating an example of a user terminal device outputting audio of a plurality of applications by using a peripheral device, according to an example embodiment.

FIG. 4 is a first diagram illustrating an example of a user terminal device outputting audio of a plurality of applications by using a peripheral device, according to an example embodiment.

As illustrated in FIG. 4, the user terminal device 100 may, according to a user setting, set audio of a first application associated with a navigation to be output through an internal speaker of the user terminal device 100 and set audio of a second application for a voice call between users to be output from a first peripheral device 200-1. In this regard, the first peripheral device 200-1 may be a wireless headset.

As described above, in a state in which devices for outputting audio of the first and second applications are set, the user terminal device 100 may execute the first application according to a user command. Accordingly, the user may be provided with a navigation function through a screen and speaker of the user terminal device 100 in which the first application is executed.

In a state in which the first application is executed, when a call request event is input, the user terminal device 100 determines whether it is possible to communicate with the first peripheral device 200-1 which is set to output audio of the second application corresponding to the call request event. If it is possible to communicate with the first peripheral device 200-1, the user terminal device 100 transmits an audio signal for audio of the second application to the first peripheral device 200-1.

That is, the user terminal device 100 outputs audio for route guide of a navigation through a speaker of the user terminal device 100, and transmits an audio signal for a user's voice which has requested a call from the first peripheral device 200-1.

Accordingly, the user may be provided with a route guide from audio and map image of a navigation output through the user terminal device 100 and simultaneously, may talk on the phone with the user who has requested a call through the first peripheral device 200-1.

Figure 5:
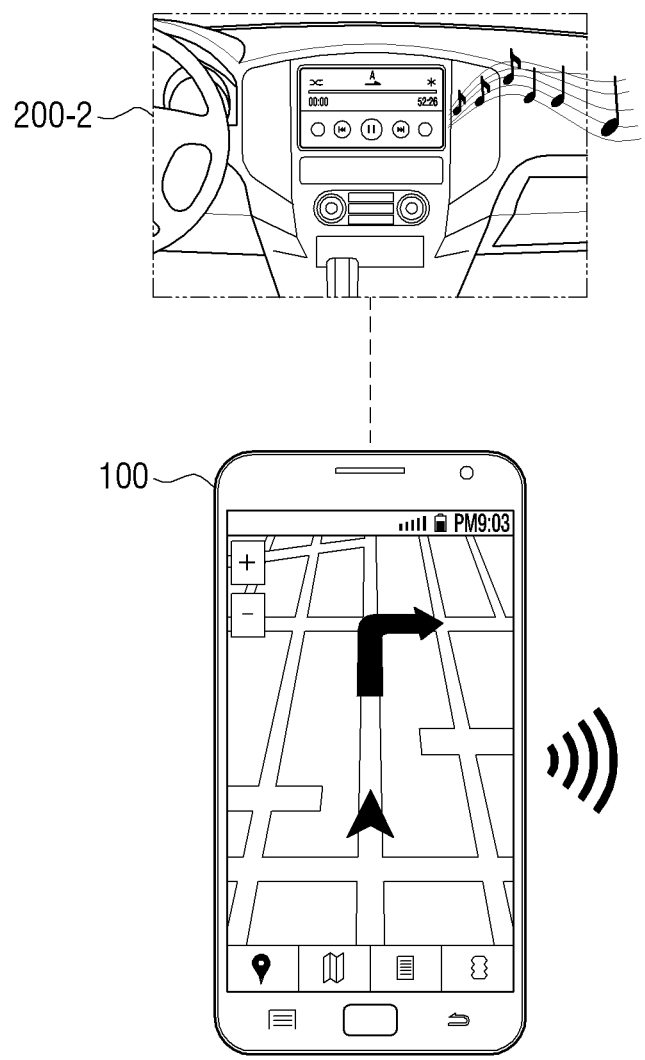
FIG. 5 is a second diagram illustrating an example of a user terminal device outputting audio of a plurality of applications by using a peripheral device, according to another example embodiment.

FIG. 5 is a second diagram illustrating an example of a user terminal device outputting audio of a plurality of applications by using a peripheral device, according to another example embodiment.

As illustrated in FIG. 5, the user terminal device 100 may, according to a user setting, set audio of a first application associated with a navigation to be output through an internal speaker of the user terminal device 100 and set music executed through a third application associated with playing media to be output from a second peripheral device 200-2. In this regard, the second peripheral device 200-2 may be a car audio device which is mounted in a vehicle of the user.

As described above, in a state in which devices for outputting audio of the first and third applications are set, a user boarding on a vehicle may request a first application of the user terminal device 100 to be executed to receive a route guide for the destination. According to the execution request, the user terminal device 100 may execute the first application. Accordingly, the user may be provided with a navigation function through a screen and speaker of the user terminal device 100 in which the first application is executed.

In a state in which the first application is executed, when a music play event is input, the user terminal device 100 determines whether it is possible to communicate with the second peripheral device 200-2 which is set to output audio of the third application corresponding to the music play event. If it is possible to communicate with the second peripheral device 200-2, the user terminal device 100 transmits an audio signal for music executed through the third application to the second peripheral device 200-2.

That is, the user terminal device 100 outputs audio for route guide of a navigation through a speaker of the user terminal device 100, and transmits an audio signal for music which the user has requested to the second peripheral device 200-2.

Accordingly, the user may be provided with a route guide from audio and map image of a navigation output through the user terminal device 100 and simultaneously, may listen to the music through the second peripheral device 200-2, which is a car audio output device mounted in the vehicle.

Figure 6:
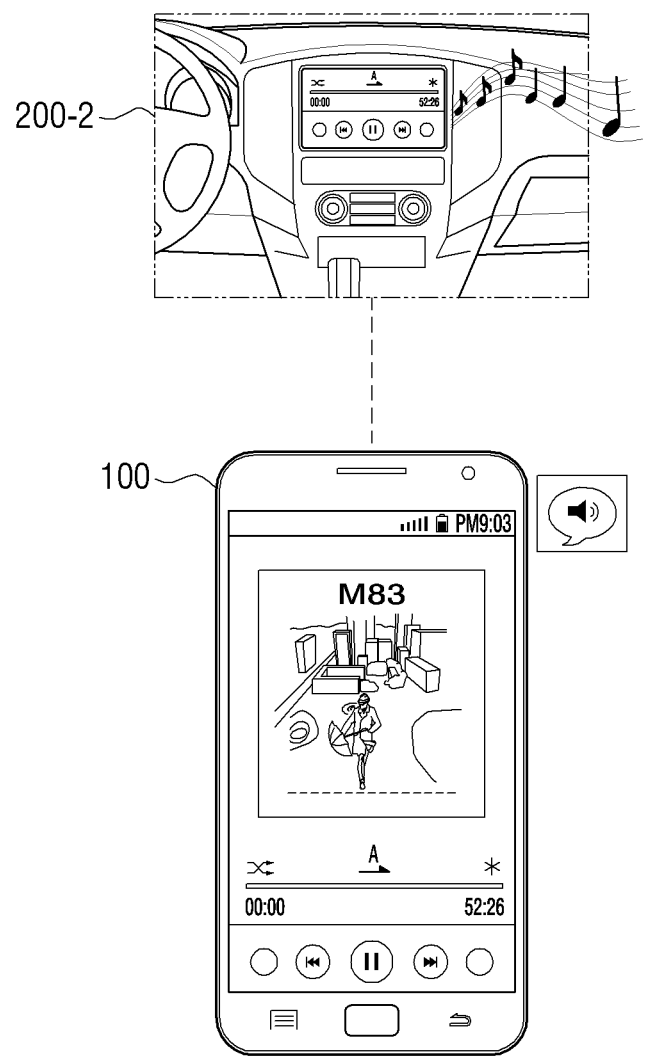
FIG. 6 is a third diagram illustrating an example of a user terminal device outputting audio of a plurality of applications by using a peripheral device, according to another example embodiment.

FIG. 6 is a third diagram illustrating an example of a user terminal device outputting audio of a plurality of applications by using a peripheral device, according to another example embodiment.

As illustrated in FIG. 6, the user terminal device 100 may, according to a user setting, set notification audio indicating that a message has been received through a fourth application associated with a messenger service to be output through an internal speaker of the user terminal device 100 and set music executed through a third application associated with playing media to be output from a second peripheral device 200-2. In this regard, the second peripheral device 200-2 may be a car audio device which is mounted in a vehicle of the user.

As described above, in a state in which devices for outputting audio of the third and fourth applications are set, the user terminal device 100 may execute the third application associated with playing media according to a music play command. In addition, the user terminal device 100 determines whether it is possible to communicate with the second peripheral device 200-2 which is set to output audio of the third application. As a result of determination, if it is possible to communicate with the second peripheral device 200-2, the user terminal device 100 transmits an audio signal for music executed through the third application to the second peripheral device 200-2.

In a state in which audio of music executed through the third application is controlled to be output through the second peripheral device 200-2, when a message reception event is input, the user terminal device 100 outputs notification audio of the fourth application corresponding to the message reception event through a speaker within the user terminal device 100.

That is, the user terminal device 100 transmits an audio signal for music requested by the user to the second peripheral device 200-2, and outputs notification audio indicating that a message has been received through the speaker of the user terminal device 100.

Accordingly, the user may check that a message has been received through notification audio output through the speaker of the user terminal device 100 while listening to music through the second peripheral device 200-2 which is a car audio output device mounted in the vehicle.

Figure 7:
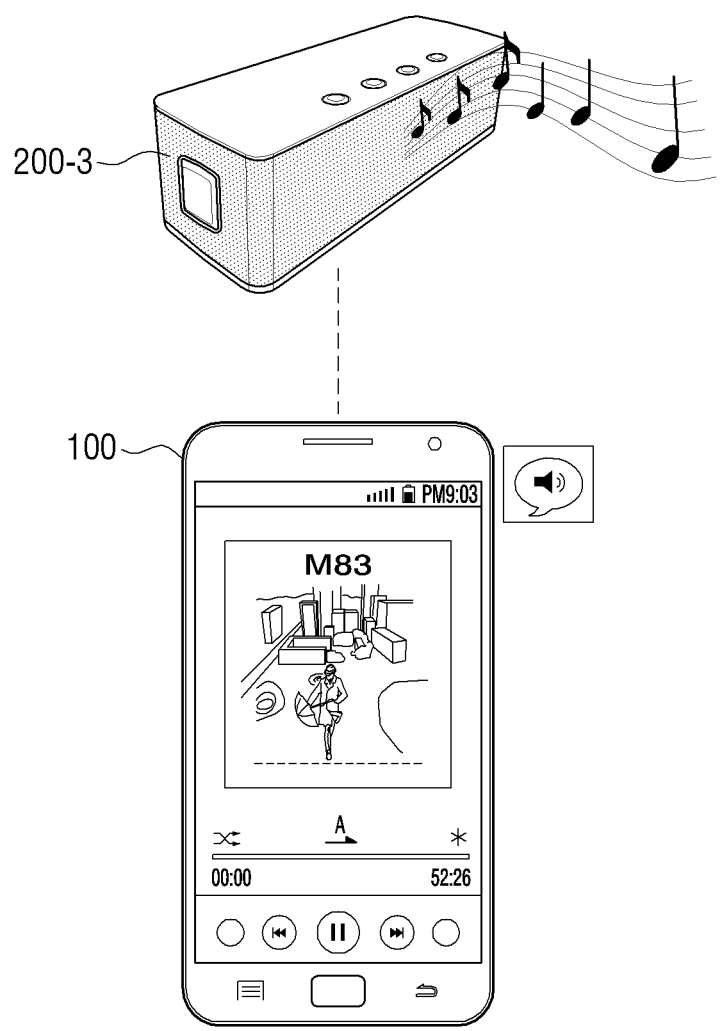
FIG. 7 is a fourth diagram illustrating an example of a user terminal device outputting audio of a plurality of applications by using a peripheral device, according to another example embodiment.

FIG. 7 is a fourth diagram illustrating an example of a user terminal device outputting audio of a plurality of applications by using a peripheral device, according to another example embodiment.

As described with reference to FIG. 6, the user terminal device 100 may, according to a user setting, set notification audio indicating that a message has been received through a fourth application associated with a messenger service to be output through an internal speaker of the user terminal device 100 and set music executed through a third application associated with playing media to be output from a second peripheral device 200-2. In this regard, the second peripheral device 200-2 may be a car audio device which is mounted in a vehicle of the user.

As illustrated in FIG. 7, the user terminal device 100 may, according to a user setting, further set the third peripheral device 200-3 as an audio output device of the third application 200-2 so that audio of music executed through the third application associated with media play is output from the third peripheral device 200-3. In this regard, the third peripheral device 200-3 may be an external speaker which is capable of wireless communication.

As described above, in a state in which devices for outputting audio of the third and fourth applications are set, the user terminal device 100 may execute the third application associated with playing media according to a music play command. In addition, the user terminal device 100 determines whether a peripheral device 200 which is set to output audio of the third application from among peripheral devices 200 found to be capable of communicating with the user terminal device 100 has been found.

As a result of determination, if the third peripheral device 200-3 which is set to output audio of the third application has been found, the user terminal device 100 transmits an audio signal for music executed through the third application to the third peripheral device 200-3.

In a state in which audio of music executed through the third application is controlled to be output through the third peripheral device 200-3, when a message reception event is input, the user terminal device 100 outputs notification audio of the fourth application corresponding to the message reception event through a speaker within the user terminal device 100.

That is, the user terminal device 100 transmits an audio signal for music requested by the user to the third peripheral device 200-3, and outputs notification audio indicating that a message has been received through the speaker of the user terminal device 100.

Accordingly, the user may check that a message has been received through notification audio output through the speaker of the user terminal device 100 while listening to music through the third peripheral device 200-3 which is an external speaker.

Figure 8:
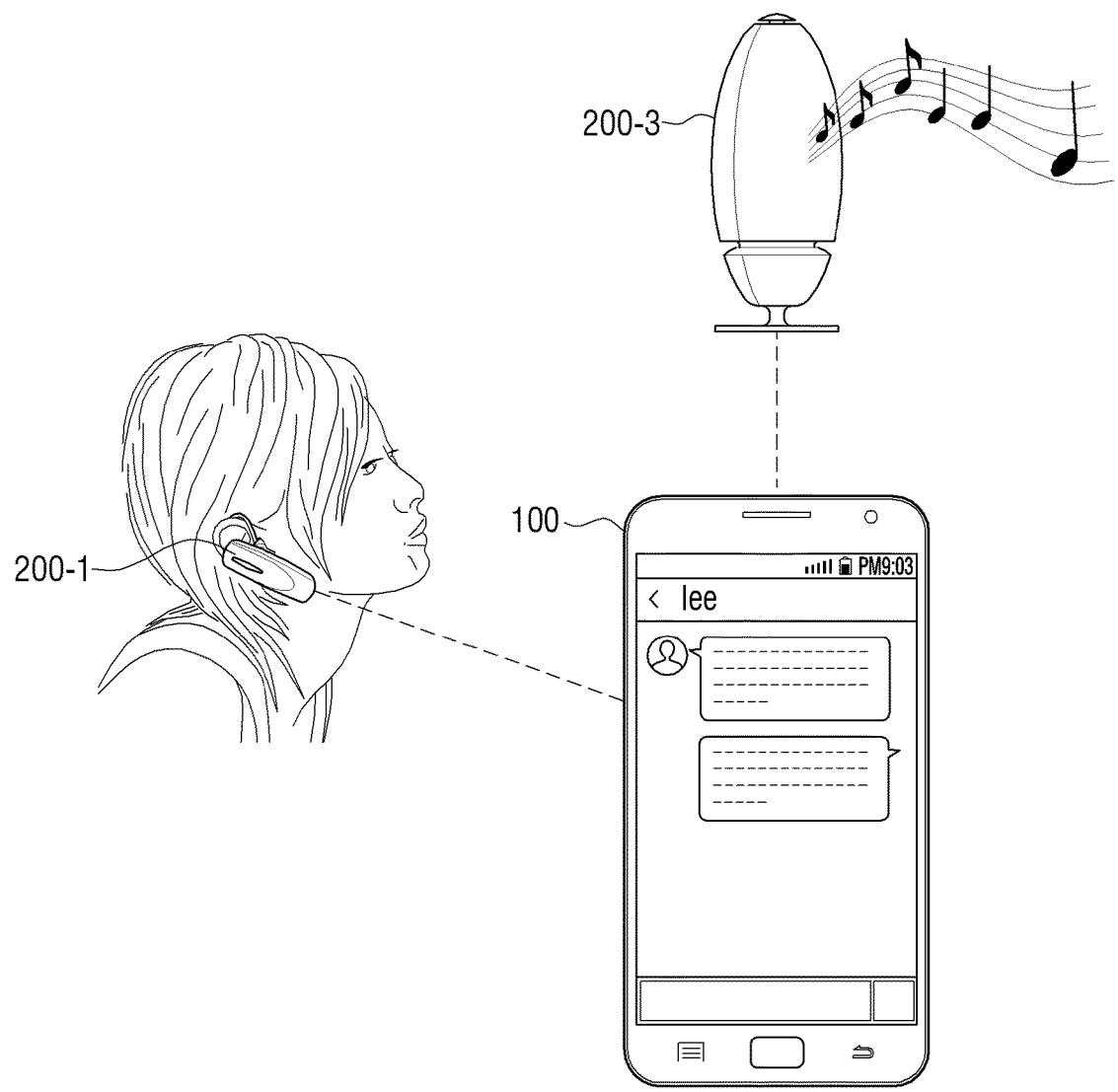
FIG. 8 is a fifth diagram illustrating an example of a user terminal device outputting audio of a plurality of applications by using a peripheral device, according to another example embodiment.

FIG. 8 is a fifth diagram illustrating an example of a user terminal device outputting audio of a plurality of applications by using a peripheral device, according to another example embodiment.

As illustrated in FIG. 8, the user terminal device 100 may be a device which is capable of automatically converting a message in a text format into a voice message.

In this regard, the user terminal device 100 may, according to a user setting, set audio for a voice message converted through a fifth application which converts a message in a text format into a voice message to be output from the first peripheral device 200-1, and may set music executed through the third application associated with media play to be output from the third peripheral device 200-3. In this regard, the third peripheral device 200-3 may be an external speaker which is capable of wireless communication.

As described above, in a state in which devices for outputting audio of the third and fifth applications are set, the user terminal device 100 may execute the third application associated with playing media according to a music play command. In addition, the user terminal device 100 determines whether a third peripheral device 200-3 which is set to output audio of the third application from among peripheral devices 200 found to be capable of communicating with the user terminal device 100 has been found.

As a result of determination, if the third peripheral device 200-3 which is set to output audio of the third application has been found, the user terminal device 100 transmits an audio signal for music executed through the third application to the third peripheral device 200-3.

In a state in which audio of music executed through the third application is controlled to be output through the third peripheral device 200-3, when a message reception event is input, the user terminal device 100 executes a fifth application, and converts a message in a text format into a voice message through the executed fifth application. Thereafter, the user terminal device 100 determines whether a first peripheral device 200-1 which is set to output audio for the voice message converted through the fifth application from among peripheral devices 200 found to be capable of communicating with the user terminal device 100 has been found.

As a result of determination, if the first peripheral device 200-1 which is set to output audio for the voice message converted through the fifth application has been found, the user terminal device 100 transmits an audio signal for the voice message converted through the fifth application to the first peripheral device 200-1.

That is, the user terminal device 100 transmits an audio signal for music requested by the user to the third peripheral device 200-3, and outputs notification audio for the voice message to the first peripheral device 200-3.

Accordingly, the user may check the voice message from the audio output through the first peripheral device which is a wireless headset while listening to music through the third peripheral device 200-3 which is an external speaker.

Figure 9:
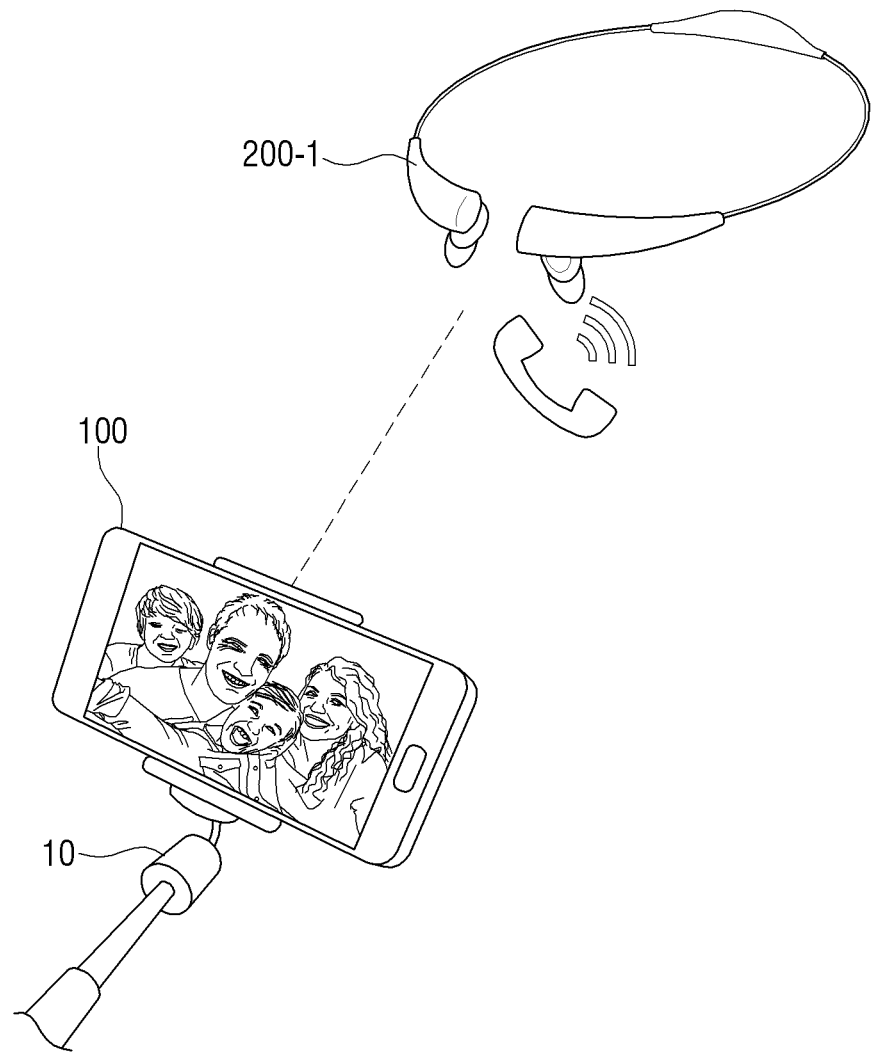
FIG. 9 is a diagram illustrating an example of a user terminal device outputting audio of an application by using a peripheral device, according to an example embodiment.

FIG. 9 is a diagram illustrating an example of a user terminal device outputting audio of an application by using a peripheral device, according to an example embodiment.

As illustrated in FIG. 9, the user terminal device 100 may, according to a user setting, set audio of a second application for a voice call between users to be output from a first peripheral device 200-1. In this regard, the first peripheral device 200-1 may be a wireless headset.

As described above, in a state in which a device for outputting audio of the second application has been set, the user terminal device 100 may be physically connected with an accessory device for image capturing through a connector to which an earphone jack is connected.

In a state in which the user terminal device 100 is communicatively connected with the accessory device, when a call request event is input, the user terminal device 100 determines whether it is possible to communicate with the first peripheral device 200-1 which is set to output audio of the second application corresponding to the call request event. If it is possible to communicate with the first peripheral device 200-1, the user terminal device 100 transmits an audio signal for audio of the second application to the first peripheral device 200-1.

Accordingly, the user may capture an image using the accessory device connected with the user terminal device 100 via a cable and simultaneously, may talk on the phone with the user who has requested a call through the first peripheral device 200-1.

However, the example is not limited thereto. The user terminal device 100 may, in a state in which an application corresponding to a user command is executed, when a call reception event is input, transmit to a first peripheral device 200-1 which is set to output audio of the second application corresponding to the call request event.

For example, an application executed in the user terminal device 100 may be a camera application for capturing an image. In this regard, the user terminal device 100 may, in a state in which the camera application is executed, when a call reception event is input, transmit to a first peripheral device 200-1 which is set to output audio of the second application corresponding to the call request event.

Accordingly, the user may capture an image through the user terminal device 100 and simultaneously, talk on the phone with the user who has requested a call through the first peripheral device 200-1.

As another example, an application executed in the user terminal device 100 may be a game application. In this regard, the user terminal device 100 may, in a state in which a game application is executed, when a call request event is input, transmit to the first peripheral device 200-1 which is set to output audio of the second application corresponding to the call request event.

Accordingly, the user may play a game through the user terminal device 100 and simultaneously, talk on the phone with the user who has requested a call through the first peripheral device 200-1.

Figure 10:
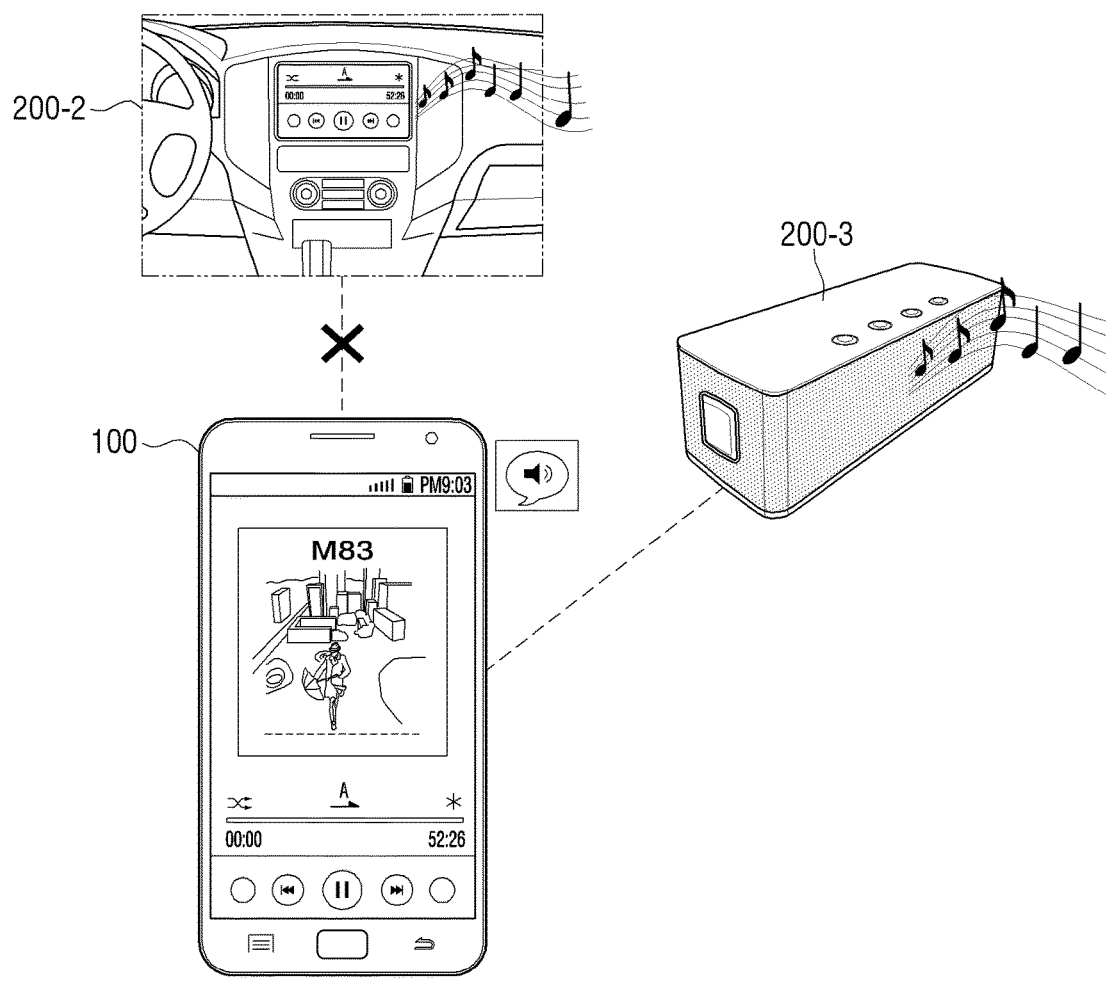
FIG. 10 is a diagram illustrating an example of a user terminal device outputting audio of a plurality of applications by using a plurality of peripheral devices, according to an example embodiment.

FIG. 10 is a diagram illustrating an example of a user terminal device outputting audio of a plurality of applications by using a plurality of peripheral devices, according to an example embodiment.

As described with reference to FIG. 7, the user terminal device 100 may, according to a user setting, set notification audio indicating that a message has been received through a fourth application associated with a messenger service to be output through an internal speaker of the user terminal device 100 and set music executed through a third application associated with playing media to be output from at least one of the second peripheral device 200-2 and the third peripheral device 200-3. In this regard, the second peripheral device 200-2 may be a car audio device which is mounted in a vehicle of the user. The third peripheral device 200-3 may be an external speaker which is capable of wireless communication.

As described above, in a state in which devices for outputting audio of the third and fourth applications are set, the user terminal device 100 may execute the third application associated with playing media according to a music play command. In addition, the user terminal device 100, when the second peripheral device 200-2 which is set to output audio of the third application from among peripheral devices 200 found as a device capable of communicating with the user terminal device 100 is found, transmits an audio signal for music executed through the third application to the second peripheral device 200-2.

In a state in which audio of music executed through the third application is controlled to be output through the third peripheral device 200-3, when a message reception event is input, the user terminal device 100 outputs notification audio of the fourth application corresponding to the message reception event through a speaker within the user terminal device 100.

Accordingly, the user may check that a message has been received through notification audio output through the speaker of the user terminal device 100 while listening to music through the second peripheral device 200-2 which is a car audio output device mounted in the vehicle.

Meanwhile, the user may go home after parking the vehicle. Accordingly, when the communicative connection between the user terminal 100 and the second peripheral device 200-2 is released, the user terminal device 100 may suspend transmitting of an audio signal for music executed through the third application to the second peripheral device 200-2.

As the user goes home, if the third peripheral device 200-3 which is set to output audio of the third application has been found, the user terminal device 100 transmits an audio signal for music executed through the third application to the third peripheral device 200-3. Accordingly, the third peripheral device 200-3 may signal-process an audio signal received from the user terminal device 100 to a form that is outputtable and output the signal-processed audio.

Accordingly, the user may continuously listen to music reproduced through the second peripheral device which is a car audio output device of the vehicle through the third peripheral device 200-3 which is an external device disposed at home of the user.

Hereinabove, the operation of outputting audio of at least one application using a peripheral device 200 by the user terminal device 100 is described in detail. Hereinafter, the operation of setting a device to output audio of a plurality of applications by the user terminal device according to an example embodiment of the present disclosure will be described in detail.

Figure 11:
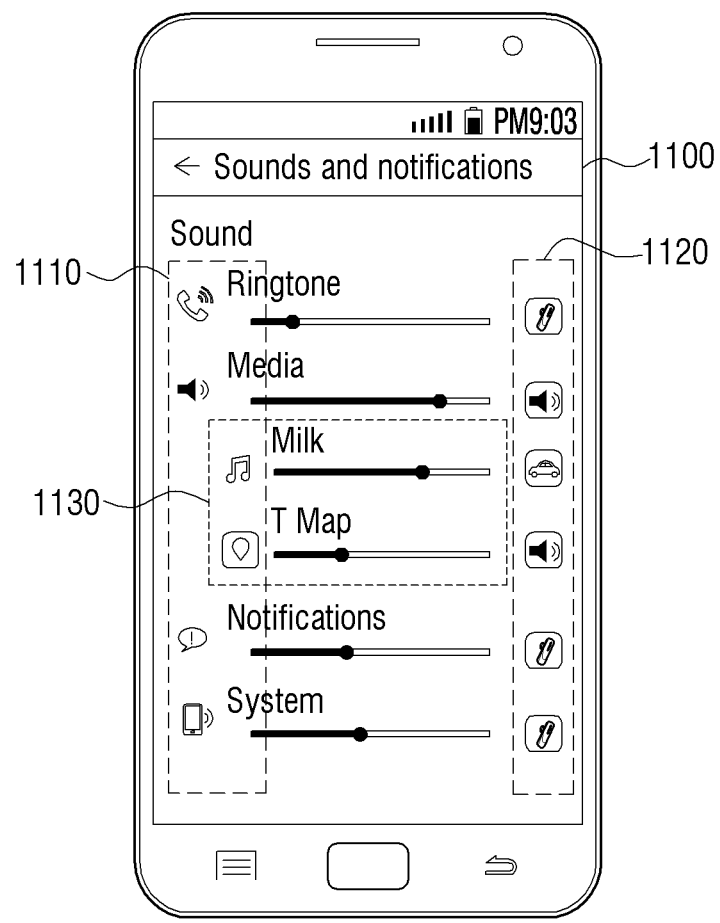
FIG. 11 is a diagram illustrating an example UI for setting, by a user terminal device, a device to output audio of a plurality of applications, according to an example embodiment.

FIG. 11 is a diagram illustrating an example UI for setting, by a user terminal device, a device to output audio of a plurality of applications, according to an example embodiment.

As illustrated in FIG. 11, the user terminal device 100 may, according to a user's request, display a UI 1100 for setting a device to output audio of a plurality of applications.

In detail, the user terminal device 100 may display a UI 1100 that includes an icon 1110 corresponding to each of a first application for outputting audio associated with a voice call, a second application for outputting media-related audio, a third application for outputting audio associated with event notification, and a fourth application for outputting audio associated with system notification and an icon 1120 corresponding to a device set to output audio of each of the first to fourth applications.

In this regard, the user terminal device 100 may match an icon corresponding to each of the first to fourth applications with an icon of a device set to output audio of each of the first to fourth applications.

The second application for outputting media-related audio may include various subordinate applications, such as a music play, navigation, game, and the like. When at least one of the various subordinate applications is executed, the user terminal device 100 may add an icon corresponding to at least one subordinate application which is executed and an icon corresponding to a device set to output audio of a subordinate application to the UI 1100 and display the UI 1100.

For example, when a subordinate application related to a music play and a subordinate application related to a navigation are executed, the user terminal device 1100 may add an icon corresponding to each of the subordinate application related to a music play and the subordinate application related to a navigation and an icon for a device set to output audio of each of the subordinate application related to a music play and the subordinate application related to a navigation to the UI 1100 and display the UI 1100 around where the icon corresponding to the second application is displayed.

Figure 12:
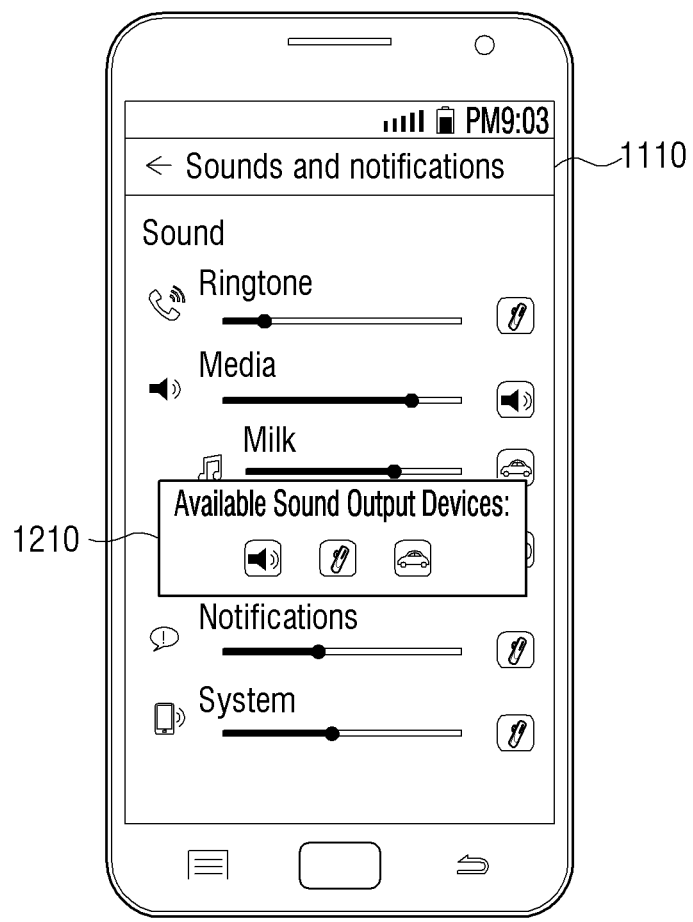
FIG. 12 is a diagram illustrating an example of changing a predetermined device on a UI for setting, by a user terminal device, a device to output audio of a plurality of applications, according to an example embodiment.

FIG. 12 is a diagram illustrating an example of changing a predetermined device on a UI for setting, by a user terminal device, a device to output audio of a plurality of applications, according to an example embodiment.

As described with reference to FIG. 11, the user terminal device 100 may, according to a user's request, display a UI 1100 for setting a device to output audio of a plurality of applications. Accordingly, the user may identify a device which is set to output audio for each application and whether an application is executed from the UI 1100 displayed on the screen.

As described above, the subordinate application associated with a music play and the subordinate application associated with a navigation are currently executed. The user may select an icon of the corresponding device to change a device set to output audio of the subordinate application associated with a music play from among the currently-executed subordinate applications.

When this selection command is input, the user terminal device 100 searches for a device currently available, and display a list UI 1210 for devices found as being available devices on the UI 1100.

In detail, the user terminal device 100 searches for the remaining peripheral devices excluding peripheral devices associated with a device set to output audio of an application currently executed from among the peripheral devices found to be capable of communicating with the user terminal device 100 as a currently available device based on setting information for a device set to output audio of a plurality of applications, and may display a list UI 1210 including an icon corresponding to the found available devices.

Accordingly, the user terminal device 100 may, when one of a plurality of icons included in the list UI 1210 displayed on the screen is selected, change a device corresponding to the selected icon as an output device for audio of a subordinate application associated with music play.

Figure 13:
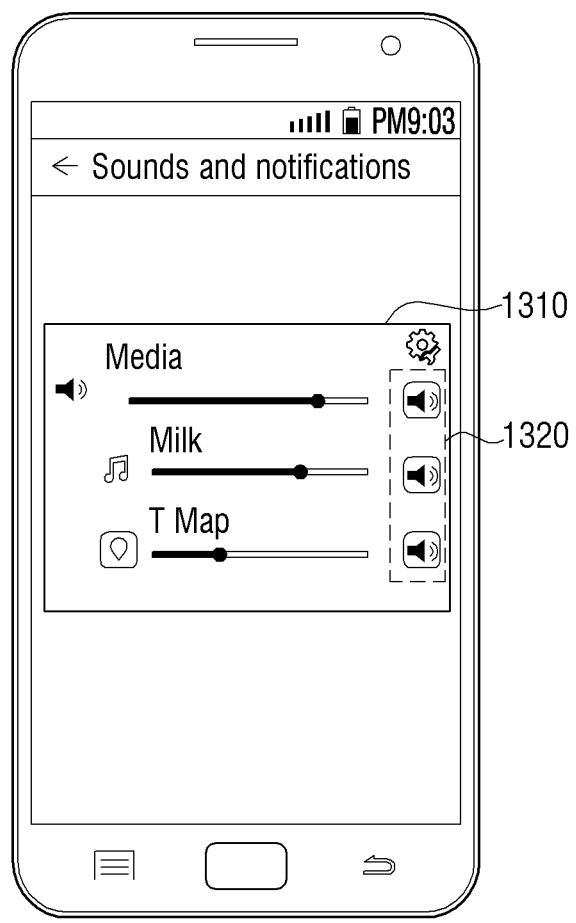
FIG. 13 is a diagram illustrating an example of outputting audio of an application in a state in which a device to output audio of the application is not registered in a user terminal device, according to an example embodiment.

FIG. 13 is a diagram illustrating an example of outputting audio of an application in a state in which a device to output audio of the application is not registered in a user terminal device, according to an example embodiment.

As illustrated in FIG. 13, the user terminal device 100 may execute an application corresponding to a user's command. In a state in which the application is executed, when a user's command to adjust volume is input, the user terminal device 100 may display a UI 1310 for an application set to output audio through a speaker of the user terminal device 100 from among a plurality of applications.

In a state in which the UI 1310 is displayed, the user may select an icon for a device set to output audio of at least one of applications included in the UI 1310. When a selection command is input, the user terminal device 100 may, as described with reference to FIG. 12, display a list UI 1210 for changing a device to output audio of the at least one application for which the icon is selected.

Thereafter, the user terminal device 100 may, when one of a plurality of icons included in the list UI 1210 displayed on the screen is selected, change a device corresponding to the selected icon as a device to output audio of the corresponding application.

Hereinabove, the operation of outputting audio of a plurality of applications using a peripheral device 200 by the user terminal device 100 through the various example embodiments is described in detail. Hereinafter, a method for outputting audio of a plurality of applications by the user terminal device 100 by using a peripheral device 200 according to an example embodiment of the present disclosure will be described in detail.

Figure 14:
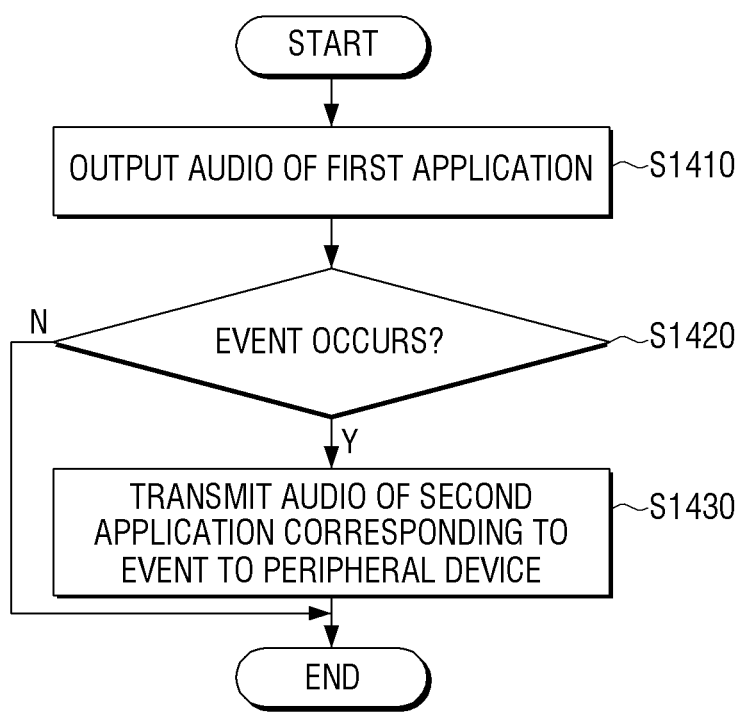
FIG. 14 is a flowchart of a method for outputting, by a user terminal device, audio of a plurality of applications by using a peripheral device, according to an example embodiment.

FIG. 14 is a flowchart of a method for outputting, by a user terminal device, audio of a plurality of applications by using a peripheral device, according to an example embodiment.

As illustrated in FIG. 14, the user terminal device 100 may output audio of a first application which is executed, at operation S1410. Thereafter, the user terminal device 100 determines whether an event occurs, while audio of the first application is output, at operation S1420.

When it is determined that an event has occurred, the user terminal device 100 transmits audio of a second application corresponding to the event to a peripheral device 200 which is capable of communicating with the user terminal device 100, at operation S1430. Accordingly, the peripheral device 200 may output audio of the second application received from the user terminal device 100.

Accordingly, the user terminal device 100 may output audio of the second application through the peripheral device 200 while maintaining output of the audio of the first application.

In detail, the user terminal device 100 may output audio of the first application through a speaker of the user terminal device based on setting information for setting a device to output audio of each of a plurality of applications, and may output audio of the second application through the peripheral device 200.

The first application which is executed may be a camera application, and the second application corresponding to the event may be a telephone application. In this regard, the user terminal device 100, while a camera application is executed, when a call request event is input, transmits audio of a telephone application corresponding to the call request event to the peripheral device 200.

Accordingly, the user may capture an image through the user terminal device 100 and simultaneously, have telephone conversation with the other party who has requested the call through the peripheral device 200.

When a message is received from an external source while at least one of an execution screen of the first application and audio is output, the user terminal device 100 transmits voice data for the received message to a peripheral device.

Accordingly, the user may use the first application being executed through the user terminal device 100 and simultaneously, check a voice message through the peripheral device 200.

Figure 15:
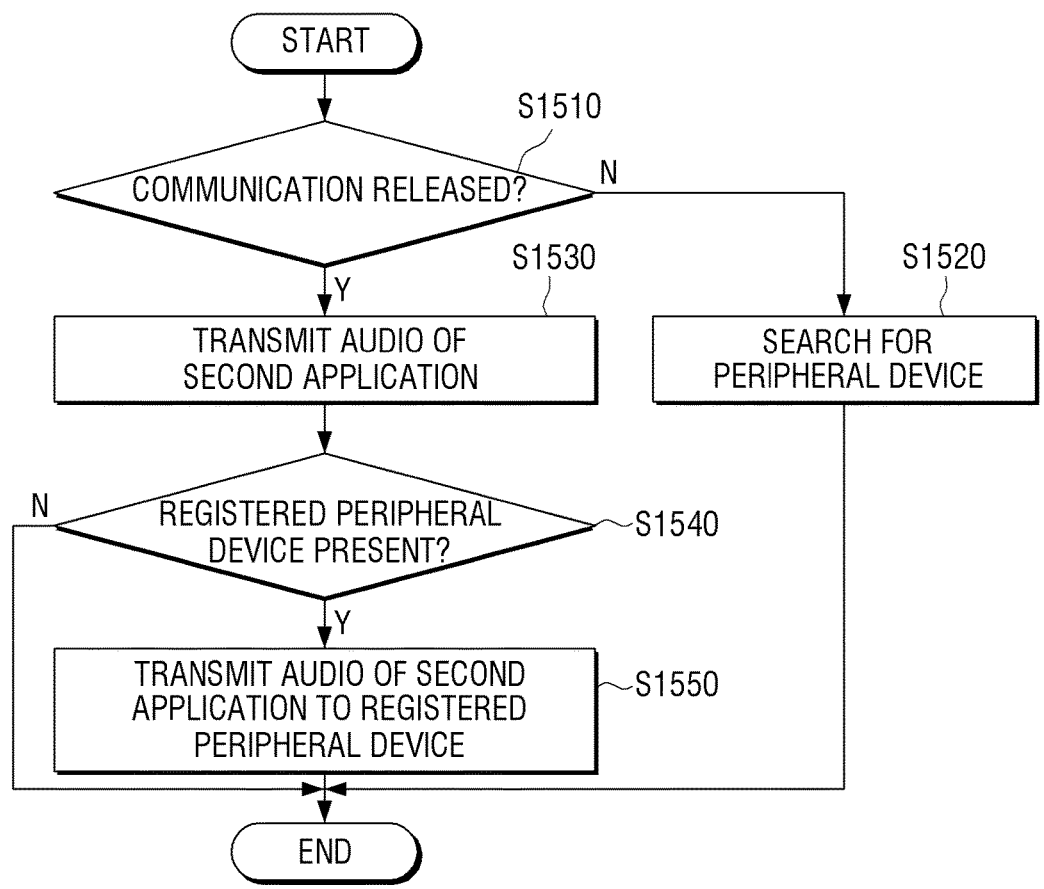
FIG. 15 is a flowchart of a method for outputting, by a user terminal device, audio of a plurality of applications by using another peripheral device according to an event occurrence, according to an example embodiment.

FIG. 15 is a flowchart of a method for outputting, by a user terminal device, audio of a plurality of applications by using another peripheral device according to an event occurrence, according to an example embodiment.

As illustrated in FIG. 15, the user terminal device 100 determines whether the communicative connection with the peripheral device 200 which outputs audio of the second application is released, at operation S1510. As a result of determination, if it is determined that the communicative connection with the peripheral device 200 is maintained, the user terminal device 100 transmits an audio signal for audio of the second application to the peripheral device 200. Accordingly, the peripheral device 200 may constantly output audio of the second application based on the audio signal received from the user terminal device 100.

If it is determined that the communicative connection with the peripheral device 200 which outputs audio of the second application is released, the user terminal device 100 searches for at least one other peripheral device which is capable of communicating with the user terminal device 100, at operation S1530. However, the example is not limited thereto, and the searching for a peripheral device which is capable of communicating with the user terminal device 100 may be carried out before determining whether the communicative connection with the peripheral device 200 which outputs audio of the second application is released.

When at least one other peripheral device 200 capable of communicating with the user terminal device 100 is found, the user terminal device 100 determines whether a peripheral device (referred to as "second peripheral device") 200 which is registered to allow audio of the second application to be output from among the found peripheral devices 200 is present, at operation S1540.

As a result of determination, if a second peripheral device 200 registered to allow audio of the second application to be output is present, the user terminal device 100 transmits an audio signal of the second application to the registered second peripheral device 200 so that the audio of the second application may be output. Accordingly, the second peripheral device 200 may output audio of the second application based on the audio signal received from the user terminal device 100.

Figure 16:
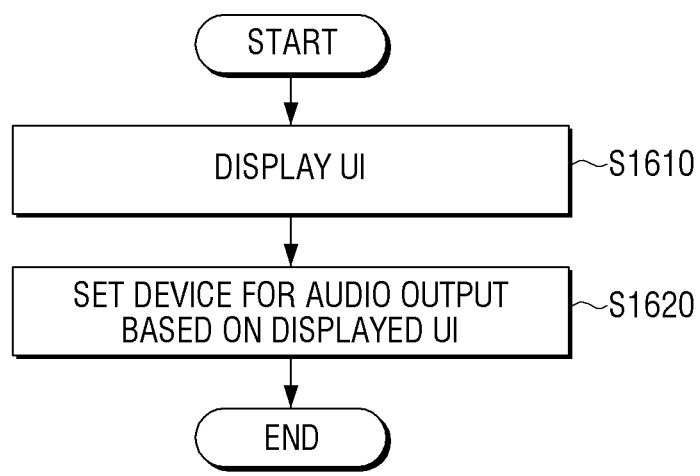
FIG. 16 is a flowchart of a method for setting a device to output audio of a plurality of applications in a user terminal device, according to an example embodiment.

FIG. 16 is a flowchart of a method for setting a device to output audio of a plurality of applications in a user terminal device, according to an example embodiment.

As illustrated in FIG. 16, the user terminal device 100 displays a UI for setting a device to output audio of each of a plurality of applications, at operation S1610, and sets a device to output audio of each of the plurality of applications based on the displayed UI, at operation S1620.

In this regard, the UI may be displayed by mapping icons of a plurality of applications with icons for outputting audio of the plurality of applications.

Accordingly, the user terminal device 100 may, when the first and second applications are executed, output audio of the first application through a speaker of the user terminal device based on setting information set through the UI, and may output audio of the second application through the peripheral device 200.

As described above, the user terminal device 100 which displays a UI for setting a device to output audio of each of a plurality of applications, when an icon of the first application from among the plurality of applications is selected, displays an icon for at least one device capable of outputting audio. Thereafter, the user terminal device 100 may, when at least one displayed icon is selected, change a device corresponding to the at least one selected icon to a device to output audio of the first application.

If a peripheral device to output audio of the second application has not been registered, the user terminal device 100 may display a UI for setting a device to output audio of each of a plurality of applications.

In a state in which this UI is displayed, when an icon of the second application is selected, the user terminal device 100 displays a UI including an icon for at least one device which is capable of outputting audio.

In a state in which a UI including an icon for at least one device which is capable of outputting audio of the second application is displayed, when at least one icon is selected, the user terminal device 100 may set a device corresponding to the selected at least one icon to a device to output audio of the first application.

In a case in which a peripheral device 200 to output audio of the second application has not been registered, when a user command for volume adjustment is input, the user terminal device 100 may display a UI for an application outputting audio through a speaker of the user terminal device 100 from among applications being executed.

Accordingly, the user terminal device 100 displays a UI for at least one application set to output audio through a speaker from among the applications that are executed. In a state in which a UI for at least one application set to output audio through a speaker from among these executed applications is displayed, when at least one application is selected, the user terminal device 100 displays an icon for at least one device which is capable of outputting audio of the selected application.

Accordingly, the user terminal device 100 displays a UI including the icon for at least one device which is capable of outputting audio of the selected application.

In a state in which a UI including an icon for at least one device which is capable of outputting audio of the selected application is displayed, when at least one icon is selected, the user terminal device 100 may change a device corresponding to the selected at least one icon to a device to output audio of the corresponding application.

While audio of the second application is output through the peripheral device 200, when an event in which a third application set such that audio is output from the peripheral device 200 is executed occurs, the user terminal device 100 may display a UI for resetting audio of the third application.

Accordingly, the user terminal device 100 displays a UI including the icon for at least one device which is capable of outputting audio of the third application. In a state in which a UI including an icon for at least one device which is capable of outputting audio of the third application is displayed, when at least one icon is selected, the user terminal device 100 may change a device corresponding to the selected at least one icon to a device to output audio of the third application.

The aforementioned control method of the user terminal device according to various example embodiments may be encoded as software and stored in a non-transitory readable medium. The non-transitory readable medium may be installed in various devices.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

The invention claimed is:

1. A user terminal device, comprising:
   communication circuitry configured to communicate with a peripheral device;
   a speaker configured to output audio signals; and
   a controller comprising a processor configured to control the communication circuitry to transmit, to the peripheral device, the audio of a second application corresponding to an event if the event occurs while the audio of a first application is output via the speaker.

2. The user terminal device as claimed in claim 1, wherein the controller controls the speaker to output the audio of the first application while the audio of the second application is transmitted to the peripheral device via the communication circuitry.

3. The user terminal device as claimed in claim 2, wherein the controller, based on communicative connection with the peripheral device being released, searches for at least one other peripheral device which is capable of communicating with the user terminal device, and based on another registered peripheral device being present from among the at least one other peripheral device, controls the communication circuitry to transmit, to the another registered peripheral device, the audio signal of the second application.

4. The user terminal device as claimed in claim 2, further comprising:
   a display configured to display a user interface that receives a command to set a device to output the audio of each of a plurality of applications,
   wherein the user interface is displayed by mapping icons of the plurality of applications with icons of devices to output the audios of the plurality of applications.

5. The user terminal device as claimed in claim 4, wherein the controller, based on an icon of a first application from among the plurality of applications being selected, displays an icon for at least one device which is capable of outputting audios, and based on the displayed at least one icon being selected, changes a device corresponding to the selected at least one icon to a device to output the audio of the first application.

6. The user terminal device as claimed in claim 4, wherein the controller, based on a peripheral device to output the audio of the second application not being registered, controls the display to display the user interface.

7. The user terminal device as claimed in claim 4, wherein the controller, while a peripheral device to output the audio of the second application is not registered, based on a user command for adjusting volume being input, controls the display to display a user interface for an application to output audio through a speaker of the user terminal device from among applications that are executed.

8. The user terminal device as claimed in claim 4, wherein the controller, while the audio of the second application is output via the peripheral device, based on an event in which a third application set to output audios from the peripheral device is executed occurring, controls the display to display a user interface for resetting the audio of the third application.

9. The user terminal device as claimed in claim 1, wherein the communication circuitry further comprises a connector which is physically and communicatively connected with an accessory device via a cable,
   wherein the controller, based on a call request event being input while the communication circuitry is communicatively connected with the accessory device via the connector, controls the communication circuitry to transmit, to the peripheral device, the audio of a telephone application corresponding to the call request event.

10. The user terminal device as claimed in claim 1, wherein the controller, based on a message being received from the outside while at least one of an execution screen of the first application and the audio of the first application is output, controls the communication circuitry to transmit voice data for the message to a peripheral device.

11. A method for controlling a user terminal device, the method comprising:
    outputting audio of a first application;
    while the audio of the first application is output, determining whether an event occurs; and
    in response to the event occurring, transmitting the audio of a second application corresponding to the event to a peripheral device which is in communicative connection with the user terminal device.

12. The method as claimed in claim 11, wherein the outputting comprises outputting the audio of the first application while the audio of the second application is transmitted to the peripheral device.

13. The method as claimed in claim 12, further comprising:
    determining whether the communicative connection with the peripheral device is released; and
    based on the communicative connection with the peripheral device being released, searching for at least one other peripheral device which is capable of communicating with the user terminal device,
    wherein the transmitting comprises, based on another registered peripheral device being present from among the at least one other peripheral device, transmitting an audio signal of the second application to the another registered peripheral device.

14. The method as claimed in claim 12, further comprising:
    displaying a user interface that receives a command to set a device to output the audio of each of a plurality of applications on a display; and
    setting a device to output audios based on the displayed user interface,
    wherein the user interface is displayed by mapping icons of the plurality of applications with icons of devices to output the audios of the plurality of applications.

15. The method as claimed in claim 14, wherein the setting comprises, based on an icon of a first application from among the plurality of applications being selected, displaying an icon for at least one device which is capable of outputting audios, and based on the displayed at least one icon being selected, changing a device corresponding to the selected at least one icon to a device to output the audio of the first application.

* * * * *